(12) United States Patent
Wang et al.

(10) Patent No.: US 10,645,005 B2
(45) Date of Patent: May 5, 2020

(54) GUI UPDATING METHOD AND DEVICE

(71) Applicant: TENCENT TECHNOLOGY (SHENZHEN) COMPANY LIMITED, Shenzhen, Guangdong (CN)

(72) Inventors: Weiguang Wang, Shenzhen (CN); Wensheng Cao, Shenzhen (CN); Xiang Han, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 149 days.

(21) Appl. No.: 15/762,266

(22) PCT Filed: Jan. 24, 2017

(86) PCT No.: PCT/CN2017/072408
§ 371 (c)(1),
(2) Date: Mar. 22, 2018

(87) PCT Pub. No.: WO2017/129105
PCT Pub. Date: Aug. 3, 2017

(65) Prior Publication Data
US 2018/0278529 A1 Sep. 27, 2018

(30) Foreign Application Priority Data
Jan. 29, 2016 (CN) .......................... 2016 1 0064040

(51) Int. Cl.
*H04L 12/801* (2013.01)
*G06F 3/14* (2006.01)
(Continued)

(52) U.S. Cl.
CPC ............ *H04L 47/12* (2013.01); *A63F 13/358* (2014.09); *A63F 13/533* (2014.09);
(Continued)

(58) Field of Classification Search
CPC ...... H04L 47/12; A63F 13/358; A63F 13/537; G06F 9/451; G06F 8/65
See application file for complete search history.

(56) References Cited

U.S. PATENT DOCUMENTS 5,666,551 A * 9/1997 Fenwick ............... G06F 11/076
709/207
5,758,149 A * 5/1998 Bierma ............... G06F 16/2308
(Continued)

FOREIGN PATENT DOCUMENTS

| CN | 101847269 A | 9/2010 |
|---|---|---|
| CN | 105511890 A | 4/2016 |
| JP | 2009-020723 A | 1/2009 |

OTHER PUBLICATIONS

DirectX Tutorial: Lesson 7: Simple Modeling (avaialble at: http://www.directxtutorial.com/Lesson.aspx?lessonid=9-4-7) (last visited Oct. 13, 2019), Sep. 5, 2015, pp. 1-11.*
(Continued)

*Primary Examiner* — Sarah Lhymn
(74) *Attorney, Agent, or Firm* — Sughrue Mion, PLLC

(57) ABSTRACT

A graphical interface update method and graphical interface update apparatus are provided. The method includes: determining a dirty region, the dirty region being a region that needs to be changed in a graphical interface; obtaining a drawing instruction, the drawing instruction indicating a drawing area; calculating an intersection set between the drawing area and the dirty region; and sending, to a user equipment, an instruction data stream indicating the intersection set, the user equipment updating the graphical interface according to the instruction data stream.

14 Claims, 8 Drawing Sheets

(51) Int. Cl.
  *A63F 13/533* (2014.01)
  *A63F 13/358* (2014.01)
  *A63F 13/537* (2014.01)
  *G06F 9/451* (2018.01)
  *G06F 8/65* (2018.01)
  *H04L 29/06* (2006.01)
  *G06T 11/40* (2006.01)

(52) U.S. Cl.
  CPC .......... *A63F 13/537* (2014.09); *G06F 3/1462* (2013.01); *G06F 8/65* (2013.01); *G06F 9/451* (2018.02); *H04L 67/38* (2013.01); *A63F 2300/209* (2013.01); *G06T 11/40* (2013.01); *G09G 2350/00* (2013.01)

(56) References Cited

U.S. PATENT DOCUMENTS

| | | | | |
|---|---|---|---|---|
| 7,847,798 | B1* | 12/2010 | Parenteau | G06T 15/405 345/422 |
| 2004/0199916 | A1* | 10/2004 | Joffe | G06F 9/3851 718/100 |
| 2007/0097138 | A1* | 5/2007 | Sorotokin | G06F 17/2247 345/581 |
| 2007/0112714 | A1* | 5/2007 | Fairweather | G06F 8/427 706/46 |
| 2009/0100483 | A1 | 4/2009 | McDowell | |
| 2009/0217187 | A1* | 8/2009 | Kendall | G06T 3/00 715/765 |
| 2009/0240880 | A1* | 9/2009 | Kawaguchi | G06F 3/0617 711/114 |
| 2010/0191884 | A1* | 7/2010 | Holenstein | G06F 11/2094 710/200 |
| 2013/0278619 | A1* | 10/2013 | Belanger | G09G 5/363 345/545 |
| 2013/0328922 | A1* | 12/2013 | Belanger | G06T 11/00 345/629 |
| 2017/0011487 | A1* | 1/2017 | Billyard | G06T 15/005 |

OTHER PUBLICATIONS

International Search Report for PCT/CN2017/072408 dated Apr. 27, 2017 [PCT/ISA/210].

* cited by examiner

```
IDirect3DVertexBuffer9::Lock(OffsetToLock, SizeToLock, ppbData, flags);
...;
Update(ppbData, ...);
...;
IDirect3DVertexBuffer9::UnLock();
```

GUI UPDATING METHOD AND DEVICE

RELATED APPLICATION

This application is a National Stage of International Application No. PCT/CN2017/072408, filed on Jan. 24, 2017, which claims priority to Chinese Patent Application No. 201610064040.1, entitled "A GUI UPDATING METHOD AND DEVICE", filed on Jan. 29, 2016 in the State Intellectual Property Office, which is incorporated herein by reference in its entirety.

FIELD

Apparatuses, methods, and devices consistent with the present disclosure relate to the field of cloud technologies, and in particular, to a graphical interface update method and apparatus.

DESCRIPTION OF RELATED ART

In recent years, with rapid development of terminal technologies and network bandwidth and growing maturity of cloud computing technologies, a cloud interactive system emerges. The cloud interactive system generally includes a server and multiple user equipments. The server may be a cluster server. Multiple interactive applications may run in the cloud interactive system.

During running of the interactive application, the server may need to exchange a graphical interface with a user equipment. Each time updating buffered data of the graphical interface, the server sends the updated buffered data to the user equipment.

It is found by means of practice that the foregoing graphical interface exchange technology consumes relatively large network traffic, and frequent graphical interface exchanges easily affect running efficiency of the server.

SUMMARY

According to one or more exemplary embodiments, there are provided a graphical interface update method and apparatus, so as to reduce network traffic for interaction between a server and a user equipment, and improve running efficiency of the server.

According to one or more exemplary embodiments, there is provided a graphical interface update method. The method includes: determining a dirty region, the dirty region being a region that needs to be changed in a graphical interface; obtaining a drawing instruction, the drawing instruction indicating a drawing area; calculating an intersection set between the drawing area and the dirty region; and sending, to a user equipment, an instruction data stream indicating the intersection set, the user equipment updating the graphical interface according to the instruction data stream.

According to one or more exemplary embodiments, there is provided a graphical interface update apparatus. The apparatus includes: a first determining module configured to determine a dirty region, the dirty region being a region that needs to be changed in a graphical interface; a first obtaining module configured to obtain a drawing instruction, the drawing instruction indicating a drawing area; a calculation module configured to calculate an intersection set between the drawing area and the dirty region; and a sending module configured to send, to a user equipment, an instruction data stream indicating the intersection set, the user equipment updating the graphical interface according to the instruction data stream.

It can be learned that in some feasible implementations of this application, a technical solution in which a server records a region that needs to be changed in a graphical interface as a dirty region; when needing to update the graphical interface, calculates an intersection set between a drawing area and the dirty region; and sends an instruction data stream of the intersection set to user equipment is used, and the following effects are achieved.

Only when the graphical interface is actually updated, the instruction data stream of the intersection set is sent, that is, the intersection set is streamed, so that streaming times are reduced. In addition, streaming is performed on only the intersection set rather than the entire dirty region, thereby reducing streaming data. Further, if there is no intersection set between some useless data and a data interval indicated by a drawing instruction, streaming is not performed, thereby further reducing the streaming data. Therefore, network traffic optimization is implemented, and network traffic for streaming can be effectively reduced.

In addition, because streaming does not need to be performed when buffered data is updated, a large number of memory copy operations on the server can be reduced, thereby effectively improving the running efficiency of the server.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description merely show some embodiments of the present disclosure, and persons of ordinary skill in the art can derive other drawings from these accompanying drawings without creative efforts.

DESCRIPTION OF EXEMPLARY EMBODIMENTS

To enable a person skilled in the art to better understand the technical solutions of this application, the following specific embodiments describe the technical solutions with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

An interactive application system includes a server and a user equipment. During running of an interactive application such as a cloud game, the server may need to exchange a graphical interface with the user equipment. The server and a client of the user equipment on which the interactive application respectively runs are generally referred to as a Trace end and a Retrace end. Using the cloud game as an example, the Trace end is a game client running on a cloud game server, that is, a cloud of the cloud game, and the Trace end performs main logic running of the game, and transmits a related graphical interface exchanged with a user to the Retrace end by using a network. The Retrace end is a client running on the user equipment, that is, a user end of the cloud game, and is configured to present a game graphical interface of the Trace end, and transmits input of a device such as a mouse or a keyboard of the user to the Trace end by using the network.

During a graphical interface exchange between the Trace end and the Retrace end, a process in which after data of an application programming interface (API), an input device, and an output device is encoded by using a network, encoded data is sent to a peer end may be referred to as streaming. Currently, there are two types of streaming technologies, that is, synchronous streaming and asynchronous streaming.

Figure 1:
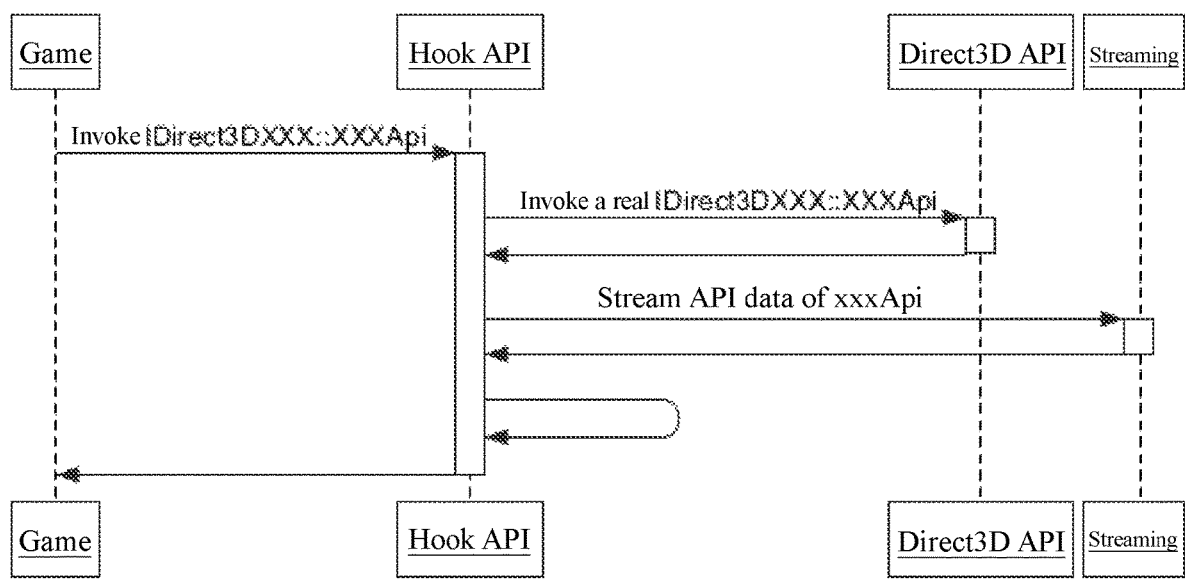
FIG. 1 is a schematic flowchart of synchronous streaming.

FIG. 1 is a schematic flowchart of synchronous streaming. In a synchronous streaming technology, streaming performed by a Trace end on an API generally occurs when the API is invoked. For function invocation, a hook API is usually entered first, then a real Direct3D API is invoked, and at last, a function, a parameter, and a return value of the API are encoded into data, to stream to a Retrace end.

Direct3D is a Microsoft-based component object model (COM) three-dimensional (3D) graphics API, and is a part of DirectX (Direct eXtension, DX). DirectX is a multimedia programming interface created by Microsoft Corporation, formed by multiple APIs, and may be divided into four portions: a display portion, a sound portion, an input portion, and a network portion according to properties. The display portion is divided into DirectDraw and Direct3D. The former is responsible for accelerating a two-dimensional (2D) image, and the later is responsible for displaying a 3D effect.

A hook technology is replacing an original function execution process with a self-defined function. A hook can be in contact with an API function entry point that needs to be modified, and changes an address of the API function entry point to point to a new self-defined function.

Figures 2, 3:
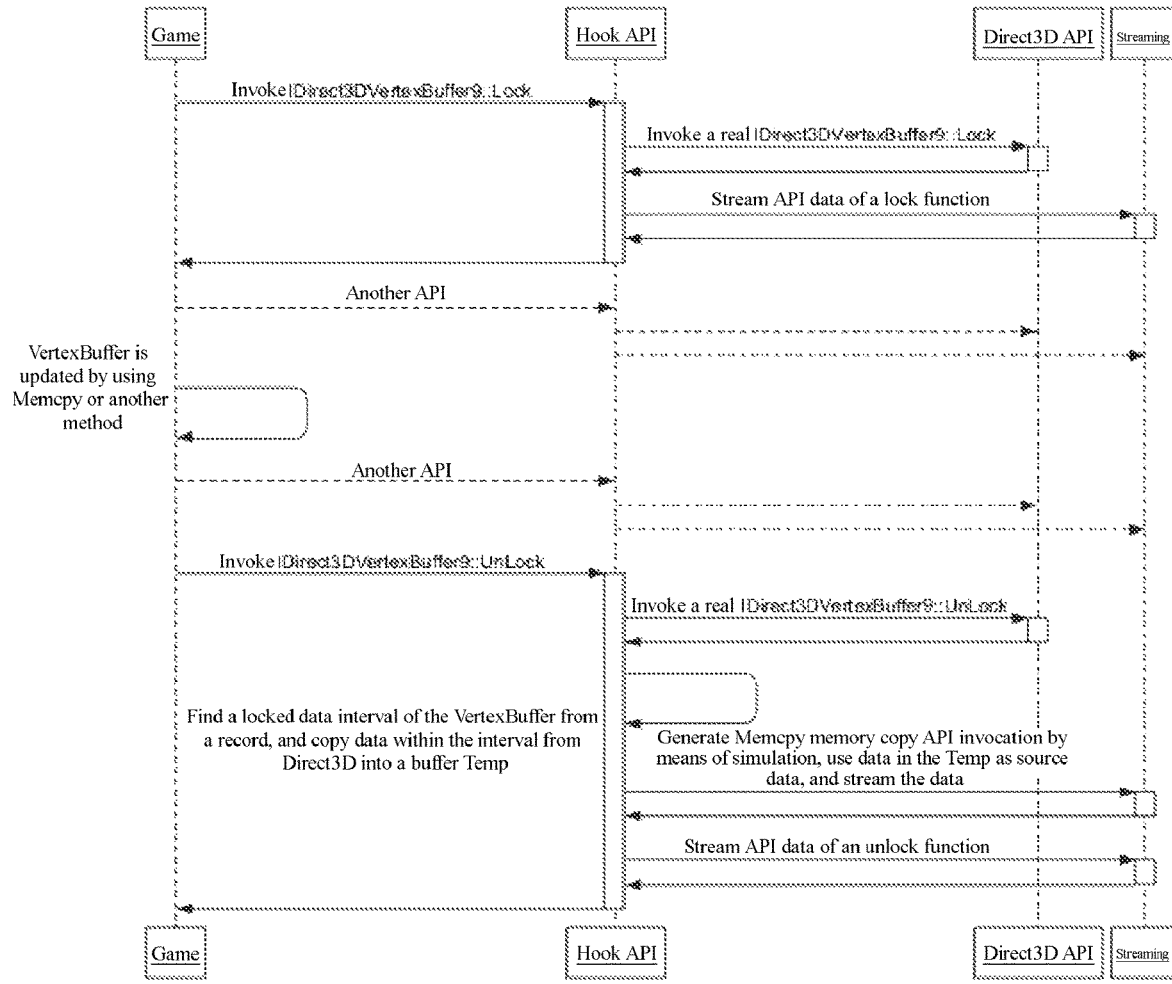
FIG. 2 is a schematic flowchart of asynchronous streaming.
FIG. 3 is a schematic diagram of pseudocode for updating a one-dimensional vertex buffer.

FIG. 2 is a schematic flowchart of asynchronous streaming. Using a Direct3D software development kit (SDK) as an example, a process of updating buffered data such as a one-dimensional vertex buffer by using an asynchronous streaming technology is shown in FIG. 2. The process includes:

First, a lock function such as IDirect3DVertexBuffer9::Lock( ) is invoked, to lock a data interval to obtain access permission. For invoking the lock function, a hook API is generally entered first, then a real Direct3D API is invoked, and then API data of the lock function is streamed to user equipment.

Second, a buffered data update, that is, Update (ppbDate), is performed on a VertexBuffer in the locked data interval. For an update method, a memory copy (Memcpy) function may be used, or another method may be used.

FIG. 3 shows pseudocode of the foregoing asynchronous streaming process.

It should be noted that after the lock function is invoked and before an unlock function is invoked, another API may be invoked in a game. It should be noted that each time an API is invoked, a hook API is generally entered first, and then a real API is invoked. In addition, each time after the API is invoked, data of the API is immediately streamed to the user equipment.

Then, the unlock function such as IDirect3DVertexBuffer9::UnLock( ) is invoked to release the locked data interval, as shown in FIG. 2. For invoking the unlock function, the hook API is entered first, and then a real Direct3D API is invoked. The IDirect3DVertexBuffer9::Lock( ) includes four parameters, which are: OffsetToLock (an initial address of a locked memory), SizeToLock (the size of the locked memory), ppbData (a returned memory pointer address), and flags (a lock attribute).

It should be noted that because the Update (ppbDate) is not an API of DirectX3D, after a data interval is locked, at a Trace end, there is no idea about how to update data of the interval. Therefore, as shown in FIG. 2, when the IDirect3DVertexBuffer9::UnLock( ) is invoked, a Memcpy function is generated by means of simulation for streaming buffered data updated in the game. Specifically, the locked data interval of the VertexBuffer is found from a record, and data within the interval is copied from the Direct3D into a buffer (Temp). The hook API invokes the Memcpy generated by means of simulation, uses data in the Temp as source data, and streams the source data to the user equipment. At last, API data of the UnLock( ) further needs to be streamed.

Therefore, two pieces of function data are streamed when one UnLock( ) function is invoked. Therefore, each time buffered data is updated, three functions, i.e., Lock( ), Memcpy( ), and UnLock( ), need to be streamed. In addition, during UnLock( ) data streaming, data is streamed according to the size of a data interval locked by the Lock( ) function.

Buffered data of a graphical interface of an interactive application such as a cloud game generally includes: a one-dimensional vertex buffer, an index buffer, a two-dimensional map, and a three-dimensional map for a 3D game.

Figure 4:
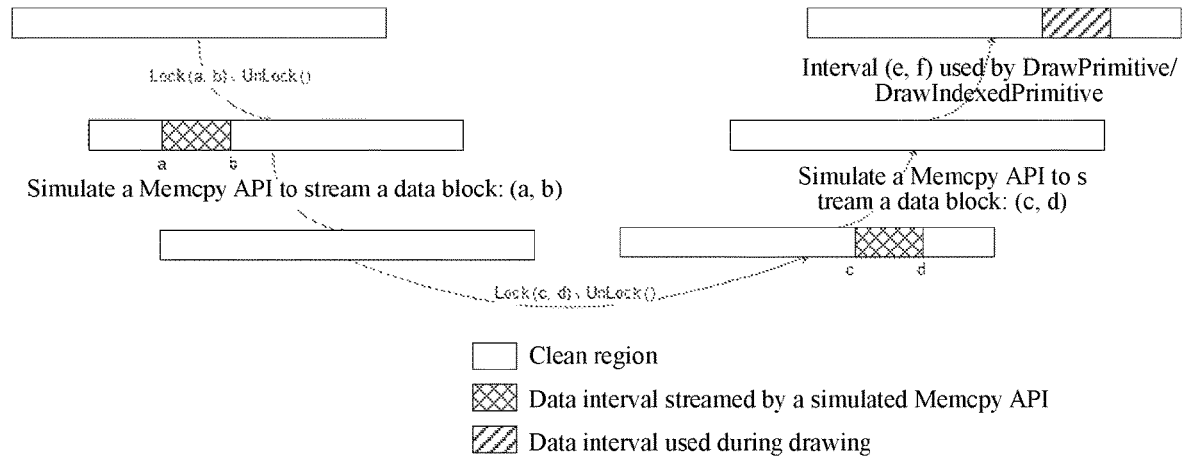
FIG. 4 is a schematic diagram of data use when a graphical interface is updated.

It is found by means of practice that when data such as the one-dimensional vertex buffer (VertexBuffer), the index buffer, the two-dimensional map, or the three-dimensional map is streamed, the foregoing instruction streaming technology has the following disadvantages:

I. A Waste of Traffic:

using a VertexBuffer as an example, it can be learned from the foregoing asynchronous streaming technology that:

1. each time UnLock( ) is invoked, a Memcpy function is asynchronously streamed, the data size is SizeToLock specified by Lock( ) and therefore, each time data of a VertexBuffer is updated in a game, three functions, i.e., Lock( ), Memcpy( ), and UnLock( ), need to be streamed;

2. referring to a schematic diagram of data use when a graphical interface is updated, as shown in FIG. 4, where assuming that a VertexBuffer is updated for multiple times such as twice in the game, data intervals locked or used during the two updates are respectively [a, b] and [c, d], and when a drawing update is performed on a graphical interface, a used VertexBuffer interval is [e, f]. If there is no intersection set between [e, f] and [a, b], and between [e, f] and [c, d], the streamed data intervals [a, b] and [c, d] are not actually used; and consequently, a waste of network traffic is caused during the drawing; and 3. when Lock( ) is executed on a game logic layer, a relatively large data interval may be indicated to be locked, but a small section of data may be actually updated, and the updated data is smaller than the locked data interval; and however, during UnLock( ) data streaming, data is streamed according to the size of the data interval locked by the Lock ( ) and consequently, data that does not need to be streamed is streamed, resulting in a waste of network traffic.

By means of analysis, a reason is: a 3D game engine provides functions such as Lock( ), UnLock( ), LockRect( ), and UnLockRect( ) to the one-dimensional vertex buffer, the index buffer, the two-dimensional map, the three-dimensional map, and the like, but does not provide an API for directly updating buffered data. In a game, data of any size may be updated in any manner in addition to by means of a data pointer obtained by using the Lock( ), and a updated data volume may be much less than an interval specified by the Lock( ). As a result, when the UnLock( ) is executed, a hook API cannot know how much data is updated in the game, and how much data needs to be used for drawing. Therefore, data streaming is performed according to only the size of the interval specified by the Lock( ).

II. Low Efficiency:

A 3D game engine provides lock/unlock functions to the one-dimensional vertex buffer, the index buffer, the two-dimensional map, and the three-dimensional map, for example, Lock( ) and UnLock( ) used for one dimension, and LockRect( ) and UnLockRect( ) used for two dimensions. When data is updated, it is considered that the data is copied from a game logic layer to a memory of a system or a memory of a graphics card memory, and the 3D game engine and the graphics card are optimized for such a use model. However, a process of data access from the memory of the graphics card to the memory used in the instruction streaming technical solution has a relatively low speed, and affects an operation speed of a graphic processing unit (GPU). Consequently, when a large number of UnLock( ) functions are invoked, a large amount of data is streamed from the graphics card to the memory, resulting in low running efficiency of the Trace end.

It can be learned from the above that by means of the foregoing streaming technology, each time the Trace end updates buffered data of the graphical interface, the buffered data is streamed to the Retrace end. Specifically, when the asynchronous streaming technology is used, each time buffered data is updated, a lock function needs to be invoked first to lock a data interval, so as to obtain access permission, so that an update operation can be performed. Then, an unlock function is further invoked to release the locked data interval. The updated buffered data needs to be streamed by using a memory copy (Memcpy) function that is generated by means of simulation, that is, each time the buffered data is updated, the following functions needs to be streamed: Lock( ), Memcpy( ), and UnLock( ). In addition, during streaming, the entire locked data interval is streamed to the Retrace end. It can be learned that the foregoing streaming technology needs to consume relatively large network traffic. In addition, a large number of Memcpy functions cause a large number of memory copy operations. As a result, the running efficiency of the Trace end is affected.

To resolve the foregoing technical problem that network traffic consumption of the Trace end is large and the running efficiency of the Trace end is not high, some exemplary embodiments of the present disclosure provide a graphical interface update method and apparatus. Detailed descriptions are respectively provided below by using specific embodiments.

One or more exemplary embodiments of the present disclosure provides a graphical interface update method.

Figure 5:
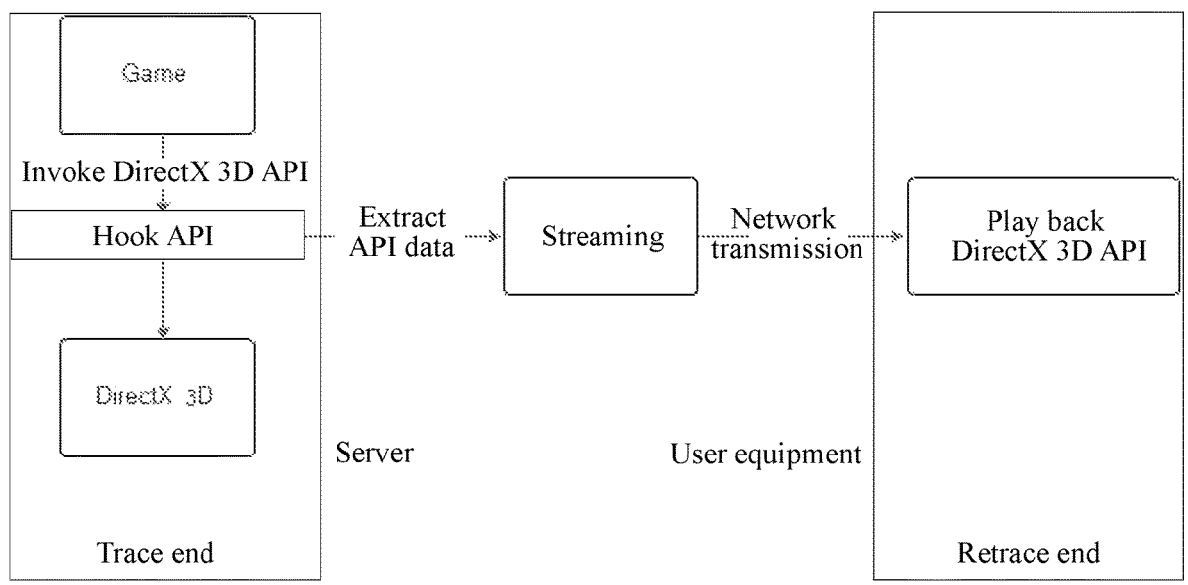
FIG. 5 is a schematic architectural diagram of an interactive application system according to an exemplary embodiment.

The method may be applied to an interactive application system shown in FIG. 5. The interactive application system includes a server and a user equipment. A Trace end runs on the server and a Retrace end runs on the user equipment. The Trace end is a cloud of an interactive application such as a cloud game. The Trace end implements main logic running of the game, and transmits a related graphical interface exchanged with a user to the Retrace end by using a network. A transmission process includes: a game logic invokes a Direct3D API to generate a graphical interface; for function invocation, a hook API is entered first, and then a real Direct3D API is invoked; and the server extracts API data, and streams the API data to the user equipment. The Retrace end is a user end running on the user equipment. The Retrace end may receive API data, play back a Direct3D API, and generate and display a graphical interface.

Figure 6:
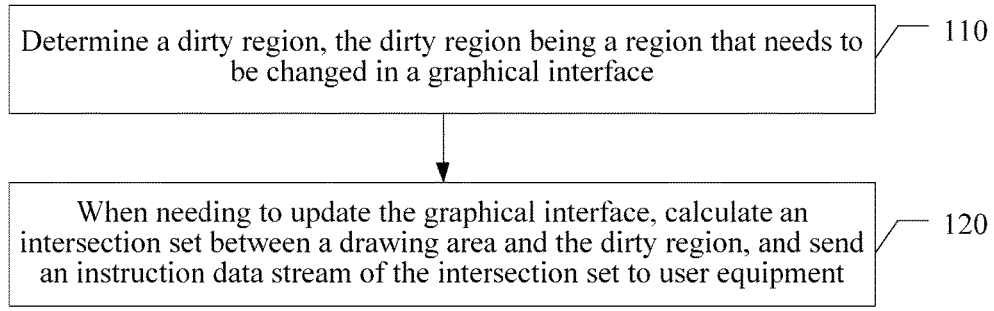
FIG. 6 is a schematic flowchart of a graphical interface update method according to an exemplary embodiment.

FIG. 6 is a schematic flowchart of a graphical interface update method according to one or more exemplary embodiments. The method may include:

110. Determine a dirty region, the dirty region being a region that needs to be changed in a graphical interface.

In this step, a server records a region that needs to be changed or updated in the graphical interface as a dirty region. It should be noted that the dirty region is a region that needs to be updated but may be not updated finally.

According to one or more exemplary embodiments, when determining the region that needs to be updated in the graphical interface, the server does not need to immediately stream data of the region to a user equipment, but only records the region as the dirty region.

According to one or more exemplary embodiments, when updating buffered data of the graphical interface, the server may invoke a lock instruction, such as a Lock( ) function, to lock a data interval, so as to obtain access permission for the data interval, then updates the buffered data in the data interval for which the access permission is obtained, and at last, an unlock instruction such as an UnLock( ) function is invoked to release the locked data interval.

According to one or more exemplary embodiments, to reduce streaming times, when obtaining the lock instruction, the server records the data interval indicated by the lock instruction as the dirty region, because the region that needs to be changed in the graphical interface is included in the data interval indicated by the lock instruction. After executing the lock instruction, the server does not need to perform streaming, that is, the server determines not to send an instruction data stream corresponding to the lock instruction to the user equipment.

Further, the server records the data interval indicated by the lock instruction as the dirty region. After executing the lock instruction, the server further obtains the buffered data required for updating the graphical interface, to update the buffered data, and after the updating, obtains and executes the unlock instruction to release the data interval locked by the lock instruction. According to one or more exemplary embodiments, because the dirty region is recorded, after the unlock instruction is executed, streaming does not need to be performed, that is, the buffered data and an instruction data stream corresponding to the unlock instruction are determined not to be sent to the user equipment.

According to one or more exemplary embodiments, the "dirty region" derives from a "dirty rectangle" algorithm, and is expansion of the "dirty rectangle".

The "dirty rectangle" means that during drawing of a 2D graphical interface on a screen, when only an image within a small rectangle needs to be updated, if the entire screen is drawn again, a waste of resources is certainly caused. Therefore, a rectangle location of the small rectangle is marked first and is not immediately updated, and the rectangle is recorded as "dirty". The rectangle recorded as "dirty" is referred to as a "dirty rectangle". When the interface is updated, all recorded rectangle regions are updated once to be changed from "dirty" to "clean". The method is referred to as the "dirty rectangle" algorithm. The "dirty rectangle" is targeted for a 2D graphical interface.

According to one or more exemplary embodiments, the "dirty region" is not targeted for the 2D graphical interface. The "dirty region" includes: an interval of a one-dimensional array, a rectangle of a two-dimensional plane, and a region of three-dimensional space. In addition, when data needs to be updated, a "dirty region" is recorded first. When the data is updated, the "dirty region" is changed to be clean.

By means of the dirty region technology, the server does not stream the lock instruction such as the Lock( ) function, and does not need to generate a Memcpy function by means of simulation, and does not stream the UnLock( ) function.

120. When needing to update the graphical interface, calculate an intersection set between a drawing area and the dirty region, and send an instruction data stream of the intersection set to a user equipment. The instruction data stream of the intersection set being used by the user equipment for updating an image within the dirty region on a side the user equipment.

In this step, a drawing instruction may be obtained first, then the intersection set between the drawing area indicated by the drawing instruction and the dirty region is calculated, and at last, the instruction data stream indicating the intersection set is sent to the user equipment, so that the user equipment updates the graphical interface according to the instruction data stream.

According to one or more exemplary embodiments, streaming occurs when the graphical interface is updated. When the graphical interface needs to be updated, an interactive application such as a cloud game sends a drawing instruction. After obtaining the drawing instruction, the server calculates, according to a parameter of the drawing instruction, a data interval indicated by the drawing instruction, the data interval being a drawing area. In this step, when calculating the intersection set between the drawing area and the dirty region, or when calculating the intersection set between the data interval indicated by the drawing instruction and the dirty region, the server streams only the intersection set, that is, the server sends only the instruction data stream of the intersection set to the user equipment. In addition, the server further needs to stream the drawing instruction, so that an instruction data stream of the drawing instruction is sent to the user equipment. The instruction data stream of the intersection set and the instruction data stream of the drawing instruction are used by the user equipment for updating an image within the dirty region on the side of the user equipment.

According to one or more exemplary embodiments, whether the intersection set is null may be determined before streaming is performed. If the intersection set is null, no instruction data stream is sent. If the intersection set is not null, a simulated lock instruction such as a Lock( ) function, a memory copy instruction such as a Memcpy function, and a simulated unlock instruction such as an UnLock( ) function are generated. The simulated lock instruction instructs to lock the intersection set, and the memory copy instruction is generated according to buffered data that needs to be updated within the dirty region. Then, the server performs streaming for the intersection set, that is, the server sends instruction data streams corresponding to the simulated lock instruction, the memory copy instruction, and the simulated unlock instruction to the user equipment.

Before the graphical interface is updated, buffered data may be updated for multiple times. Therefore, there may be multiple dirty regions, and multiple intersection sets may be obtained in this step, so that before the instruction data stream corresponding to the intersection set is sent, a Memcpy function may be generated for each of the multiple intersection sets. During streaming, instruction data streams corresponding to a Lock( ) function, multiple Memcpy functions, and an UnLock( ) function are sent.

Further, each time the graphical interface is updated, the dirty region further needs to be updated. The updating the dirty region includes: removing the streamed intersection set from the recorded dirty region, and using the remaining dirty region as a current dirty region, so that the dirty region is updated.

The instruction data stream corresponding to the intersection set is sent to the user equipment, and is used by the user equipment to update the image within the dirty region on the side of the user equipment. On a side of the server, the server also needs to execute the drawing instruction to update the image within the dirty region on the side of the server by using data of the intersection set. Therefore, the graphical interface is updated on the side of server and the side of the user equipment. It can be learned from the above that in some feasible implementations of this application, at least the following effects are obtained:

Only when the graphical interface is actually updated, the instruction data stream of the intersection set is sent, that is, the intersection set is streamed, so that streaming does not need to be performed when buffered data is updated, thereby reducing streaming times. In addition, streaming is performed on only the intersection set rather than the entire dirty region, thereby reducing streaming data. Further, if there is no intersection set between some useless data and the data interval indicated by the drawing instruction, streaming is not performed, thereby further reducing the streaming data. Therefore, network traffic optimization is implemented, and network traffic for streaming can be effectively reduced.

In addition, because streaming does not need to be performed when the buffered data is updated, a large number of memory copy operations on the server can be reduced, thereby effectively improving the running efficiency of the server.

For better understanding of the technical solutions provided in one or more exemplary embodiments of the present disclosure, a description is provided below by using an implementation manner in a specific scenario as an example.

Figure 7:
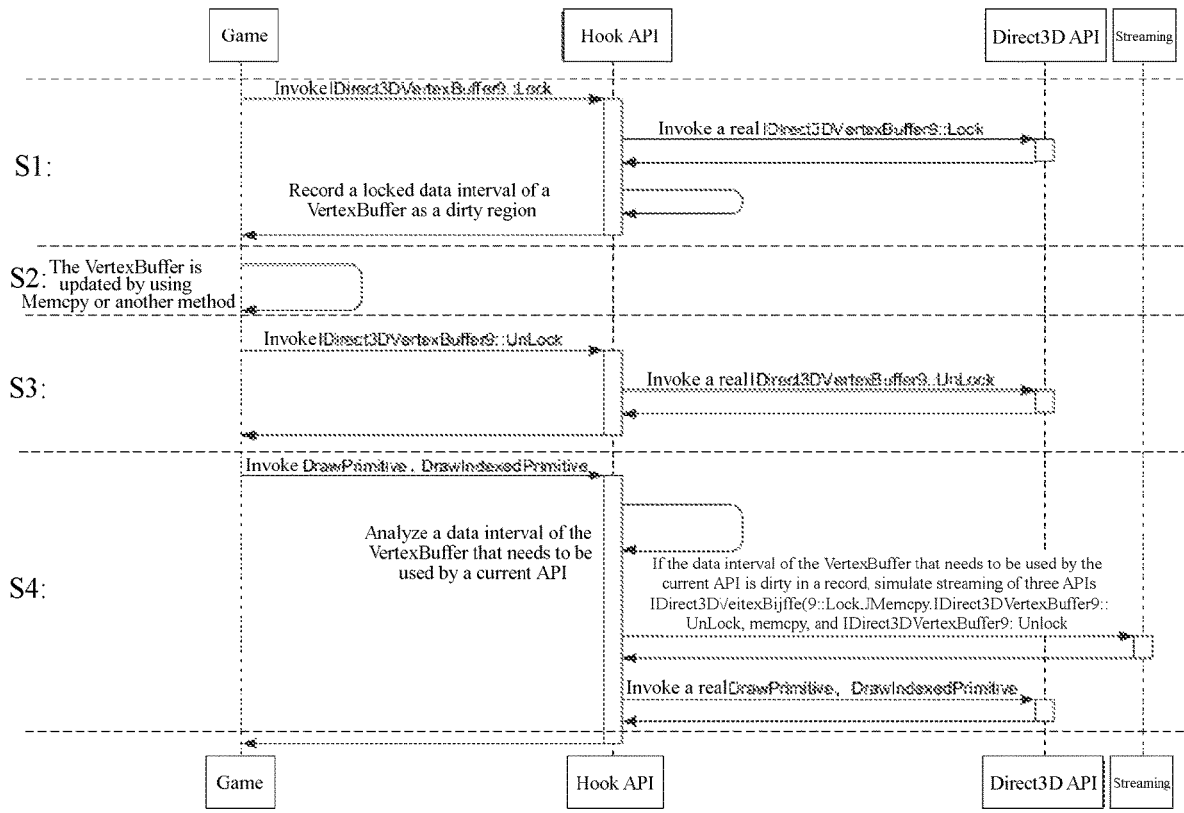
FIG. 7 is a schematic flowchart of a graphical interface update method according to a specific scenario embodiment.

Referring to FIG. 7, in one or more exemplary embodiments, a one-dimensional vertex buffer (VertexBuffer) is updated in a game running in an interactive application system. Another graphical interface update method according to one or more exemplary embodiments may include:

S1: When buffered data of a graphical interface needs to be updated, invoke a Lock( ) function, that is, IDirect3DVertexBuffer9::Lock in the game. By means of a hook technology, for invoking the Lock( ) function, a hook API is entered first. In the hook API, a real Lock( ) is invoked first, then a data interval indicated by the Lock( ) function is associated with a VertexBuffer object, and the data interval is stored and recorded as a dirty region.

S2: Update VertexBuffer data in the game. In this case, a server does not perform any operation. A Memcpy function may be used in a update method, or another method may be used.

S3: Invoke an UnLock( ) function, that is, IDirect3DVertexBuffer9::UnLock in the game. By means of the hook technology, for invoking the UnLock( ) function, the hook API is entered first, and in the hook API, a real Unlock( ) function is directly invoked.

S4: When the graphical interface needs to be updated, invoke a drawing function DrawPrimitive or DrawIndexedPrimitive in the game. When the drawing function is invoked, the hook API is entered first, a data interval of a VertexBuffer that needs to be used by a current API is analyzed. If the data interval is recorded as dirty, the Lock ( ) function is simulated once, the Memcpy function is simulated for multiple times, and the UnLock( ) is simulated once, and the simulated functions are streamed to user equipment. At last, in the hook API, a real drawing function DrawPrimitive or DrawIndexedPrimitive is invoked. For a further description of this step, referring to FIG. 8.

Figure 8:
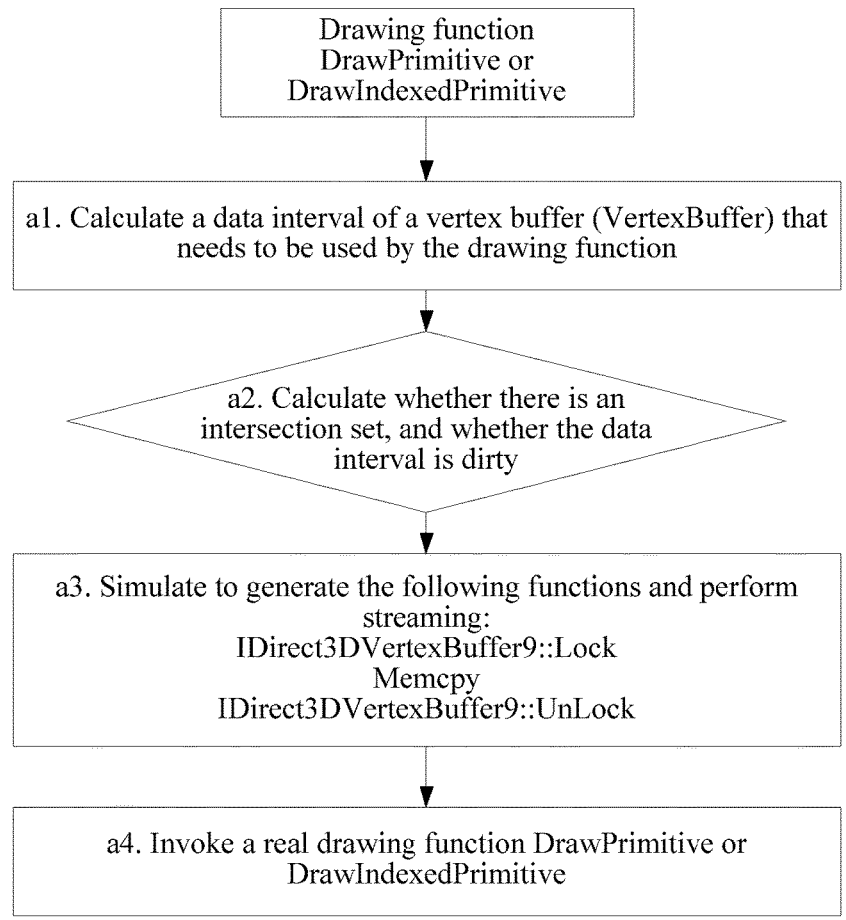
FIG. 8 is a detailed flowchart of invoking a drawing function according to an exemplary embodiment.

FIG. 8 is a detailed flowchart of invoking a drawing function DrawPrimitive or DrawIndexedPrimitive, including:

a1: Calculate, by using a parameter of the drawing function, a data interval of the VertexBuffer that needs to be used by the drawing function.

a2: Calculate whether there is an intersection set, and whether the data interval is dirty. In one or more exemplary embodiments, an intersection set between the data interval and the previously recorded dirty region is calculated.

a3: If the intersection set is not null, the following functions are generated by means of generation: the Lock( ) function is stimulated once, the Memcpy function is stimulated for multiple times, and the UnLock( ) function is stimulated once, and the stimulated functions are streamed. If the intersection set is not null, the data is not streamed.

a4: Invoke a real DrawPrimitive or a real DrawIndexedPrimitive.

It can be learned that during drawing, the data interval of the VertexBuffer that needs to be used by a current API, that is, the drawing function is analyzed. When the data interval is dirty or there is an intersection set between the data interval and the dirty region, invocation of three APIs are generated by means of simulation, that is, invocation of three functions Lock( ), Memcpy, and UnLock( ). Specifically, the Lock( ) and the UnLock( ) may be respectively: IDirect3DVertexBuffer9::Lock and IDirect3DVertexBuffer9::UnLock. At last, the real DrawPrimitive or the real DrawIndexedPrimitive is invoked.

Figure 9:
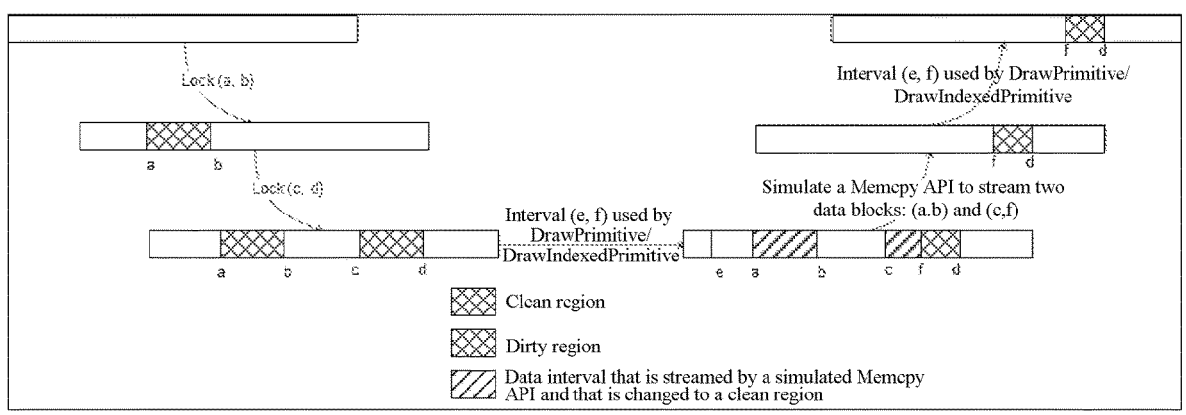
FIG. 9 is a schematic process diagram of a dirty region algorithm according to an exemplary embodiment.

A dirty region algorithm is described below by using an example:

As shown in FIG. 9, in one frame, an example in which a Lock( ) function, an UnLock( ) function, and a DrawPrimitive or DrawIndexedPrimitive function are invoked for multiple times for a VertexBuffer is used to describe the dirty region algorithm in one or more exemplary embodiments.

b1: Invoke the Lock( ) and the UnLock( ) in a game for the first time, and after an interval [a, b] is updated, update a "dirty region" {[a, b] } of the VertexBuffer.

b2: Invoke the Lock( ) and the UnLock( ) for the same VertexBuffer in the game for the second time, and after an interval [c, d] is updated, update a "dirty region" {[a, b], [c, d] } of the VertexBuffer.

b3: When the drawing function DrawPrimitive or DrawIndexedPrimitive is invoked in the game for the first time:

It is assumed that an interval used by the drawing function is [e, f], and the "dirty region" is {[a, b], [c, d] }, where e<a, c<f<d. As shown in the figure, there are two "dirty" intervals [a, b] and [c, f], so that the following steps are performed:

simulate the Lock( ) function once, simulate the Memcpy function twice, respectively stream data of the intervals [a, b] and [c, f], and simulate the UnLock( ) function once;

update a "dirty region" {[f, d] };

stream the DrawPrimitive or the DrawIndexedPrimitive; and invoke the real DrawPrimitive or the real DrawIndexedPrimitive.

b4: When the drawing function DrawPrimitive or DrawIndexedPrimitive is invoked in the game for the second time:

It is assumed that an interval used by the drawing function is [e, f], and the "dirty region" is {[f, d] }. There is no intersection set between them, that is, when data used by the current drawing function is "clean", the Lock( ), Memcpy, and UnLock( ) functions do not need to be simulated, so that the following steps are performed:

stream the DrawPrimitive or the DrawIndexedPrimitive; and invoke the real DrawPrimitive or the real DrawIndexedPrimitive.

It can be learned that in some feasible implementation of this application, at least the following technical effects can be obtained by using the dirty region algorithm:

I: Reduced network traffic for streaming: According to one or more exemplary embodiments, when the technical solution is applied to functions such as the Lock( ), the UnLock( ), the LockRect( ), and the UnLockRect( ) of the buffered data such as the one-dimensional vertex buffer, the index buffer, the two-dimensional map, and the three-dimensional map, the number of streamed APIs can be reduced. In addition, these function are streamed only when the drawing function such as the DrawPrimitive or the DrawIndexedPrimitive is invoked, and by means of dirty region algorithm management, clean regions are not streamed for multiple times, thereby reducing the network traffic for the streaming. The network traffic for the streaming can be further reduced particularly for a case in which an interval indicated by the Lock( ) is large and an updated buffered interval is small. Therefore, optimization on the network traffic for the streaming is implemented.

II: Improved running efficiency of the server or the Trace end: Because the number of streamed APIs is streamed, memory copy operations for the graphic card to the memory are reduced, thereby indirectly improving the running efficiency of the Trace end.

It should be noted that the description using the one-dimensional vertex buffer (VertexBuffer) as an example may further be applied to corresponding lock and unlock functions of the index buffer (IndexBuffer), the two-dimensional map, and the three-dimensional map in a 3D game. A method is the same as the foregoing method, and details are not described herein again.

In addition, in other instruction streaming-based remote solutions, the technical solution of this application can be applied provided that an API satisfies the following conditions: streamed data is not immediately used by a Retrace end, for example, a graphic is drawn or music is played; and when another API is invoked, the streamed API data is used.

To better implement the foregoing solutions of the embodiments of the present disclosure, the following further provides related apparatuses configured to cooperate to implement the foregoing solutions.

Figure 10:
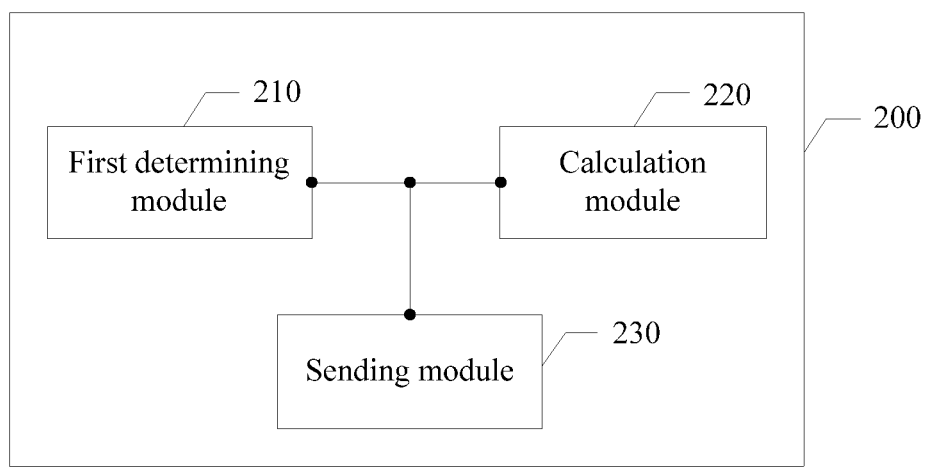
FIG. 10 is a schematic structural diagram of a graphical interface update apparatus according to an exemplary embodiment.

Referring to FIG. 10, according to one or more exemplary embodiments, there is provided a graphical interface update apparatus 200. The apparatus 200 is applied to a server of an interactive application system, and the interactive application system includes a user equipment and the server. The apparatus 200 includes:

a first determining module 210 configured to determine a dirty region, the dirty region being a region that needs to be changed in a graphical interface; a calculation module 220 configured to calculate an intersection set between a drawing area and the dirty region; and a sending module 230 configured to send, to the user equipment, an instruction data stream indicating the intersection set, the user equipment updating the graphical interface according to the instruction data stream.

Figure 11:
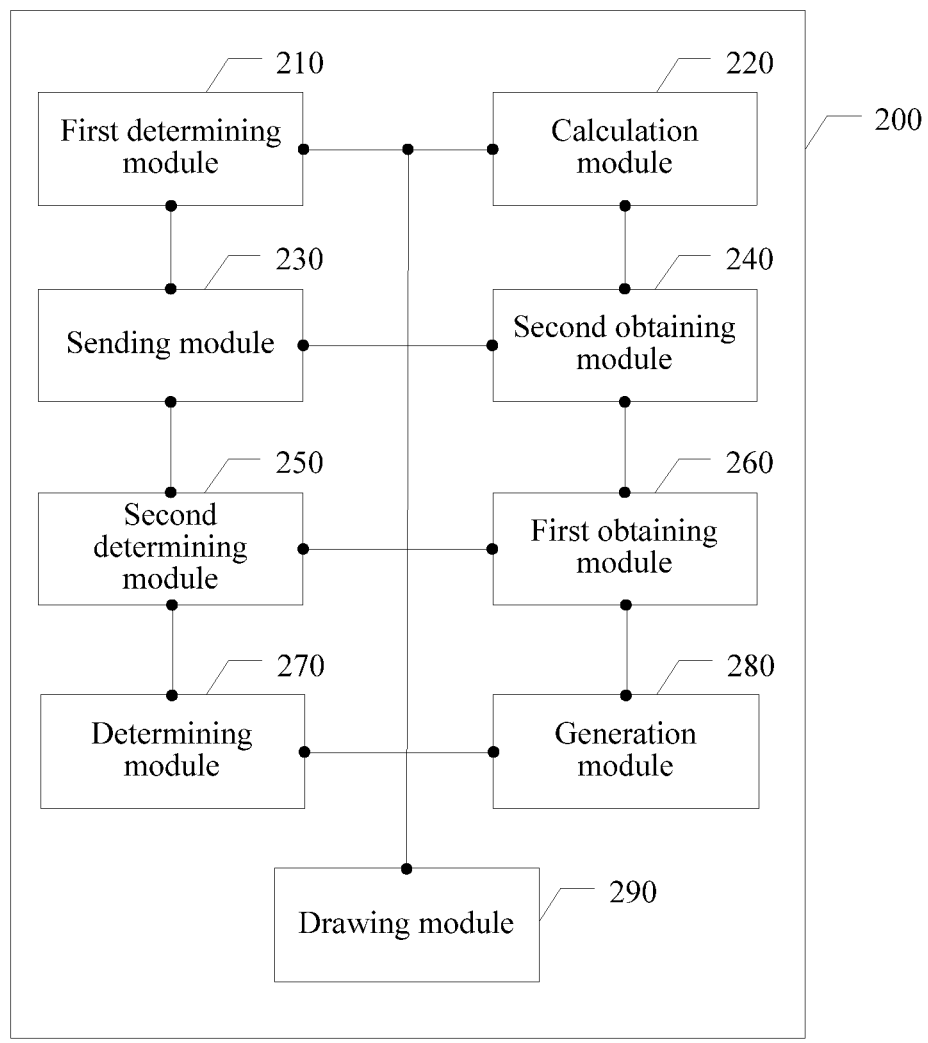
FIG. 11 is a schematic structural diagram of another graphical interface update apparatus according to another exemplary embodiment.

FIG. 11 is a schematic structural diagram of another graphical interface update apparatus according to one or more exemplary embodiments.

In addition to the modules as shown in FIG. 10, the apparatus 200 in FIG. 11 further includes: a second obtaining module 240 configured to obtain a lock instruction, where the first determining module 210 determines the dirty region according to a data interval indicated by the lock instruction.

In one or more exemplary embodiments, the second obtaining module 240 is further configured to obtain buffered data required for updating the graphical interface, and an unlock instruction.

In one or more exemplary embodiments, the apparatus 200 further includes a second determining module 250 configured to: determine an instruction data stream corresponding to not sending the lock instruction to the user equipment, and determine not sending the buffered data and an instruction data stream corresponding to the unlock instruction to the user equipment.

In one or more exemplary embodiments, the apparatus 200 further includes a first obtaining module 260 configured to obtain a drawing instruction, the drawing area is a data interval indicated by the drawing instruction, where the sending module 230 is further configured to send an instruction data stream of the drawing instruction to the user equipment.

In one or more exemplary embodiments, the apparatus 200 further includes a determining module 270 configured to determine whether the intersection set is null. In one or more exemplary embodiments, the apparatus 200 further includes a generation module 280 configured to generate a simulated lock instruction, a memory copy instruction, and a simulated unlock instruction for the intersection set, in response to the intersection set is not null, where the sending module 230 may further be configured to send instruction data streams corresponding to the simulated lock instruction, the memory copy instruction, and the simulated unlock instruction to the user equipment.

In one or more exemplary embodiments, the first determining module 210 is further configured to remove the intersection set from the dirty region, to update the dirty region. In one or more exemplary embodiments, the apparatus 200 further includes a drawing module 290 configured to: execute the drawing instruction, and update an image within the dirty region by using data of the intersection set.

It can be understood that, functions of functional modules of the apparatus in this embodiment of the present disclosure may be specifically implemented according to the methods in the foregoing method embodiments. For specific implementation processes thereof, reference may be made to related descriptions in the foregoing method embodiments, and details are not described herein again.

It can be learned from the above that in some feasible implementations of this application, a graphical interface update apparatus is provided, and the following effects are obtained:

Only when the graphical interface is actually updated, the instruction data stream of the intersection set is sent, that is, the intersection set is streamed, so that streaming does not need to be performed when buffered data is updated, thereby reducing streaming times. In addition, streaming is performed on only the intersection set rather than the entire dirty region, thereby reducing streaming data. Further, if there is no intersection set between some useless data and the data interval indicated by the drawing instruction, streaming is not performed, thereby further reducing the streaming data. Therefore, network traffic optimization is implemented, and network traffic for streaming can be effectively reduced.

In addition, because the streaming does not need to be performed when the buffered data is updated, a large number of memory copy operations on the server can be reduced, thereby effectively improving the running efficiency of the server.

According to one or more exemplary embodiments, there is further provided a computer readable storage medium storing one or more programs. When the one or more programs are executed by a server including one or more processors, the server is caused to perform the graphical interface update method described in the foregoing method embodiments.

Figure 12:
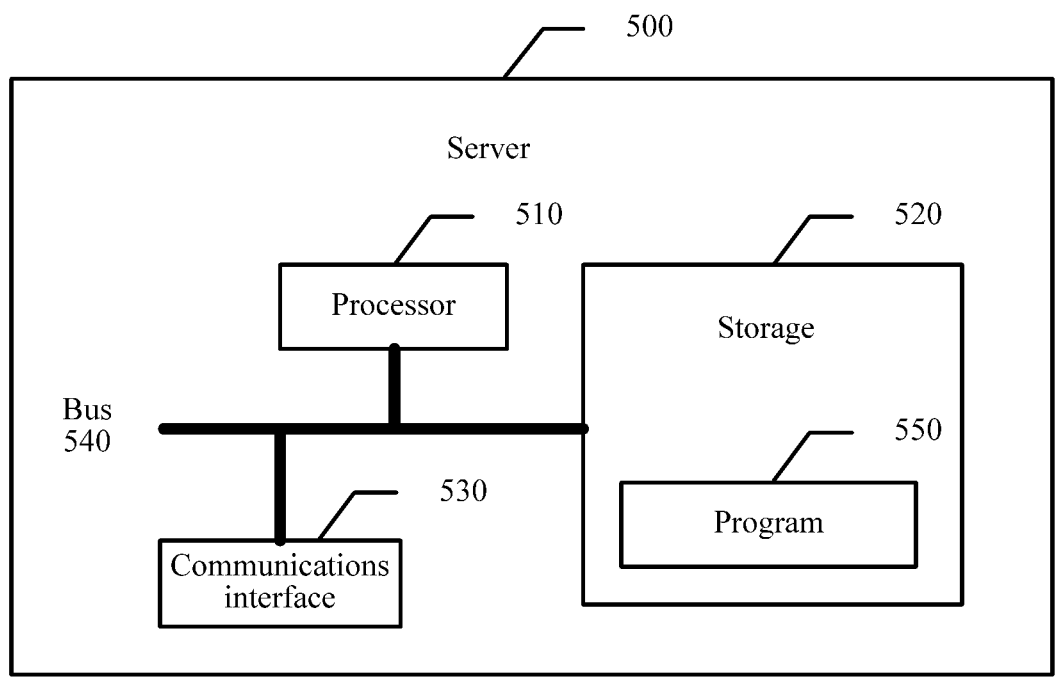
FIG. 12 is a schematic structural diagram of a server according to an exemplary embodiment.

Referring to FIG. 12, according to one or more exemplary embodiments, there is provided a computing apparatus 500. An example of the apparatus is a server and the server may include:

a processor 510, a storage 520, a communications interface 530, and a bus 540, where the processor 510, the storage 520, and the communications interface 530 communicate with each other by using the bus 540; the communications interface 530 is configured to receive and send data; the storage 520 is configured to store a program 550; the processor 510 is configured to execute the program in the storage; and when the server 500 is running, the processor 510 executes the program 550 stored in the storage 520, so that the server 500 performs the graphical interface update methods described in the foregoing method embodiments.

The processor 510 may be configured to: determine a region that needs to be updated in a graphical interface as a dirty region; and when the graphical interface needs to be updated, calculate an intersection set between a drawing area and the dirty region.

The communications interface 530 may be configured to send an instruction data stream of the intersection set to user equipment, the instruction data stream of the intersection set being used by the user equipment for updating an image within the dirty region on a side of the user equipment.

The bus may be an industry standard architecture (ISA) bus, a peripheral component interconnect (PCI) bus, an extended industry standard architecture (EISA) bus, or the like. The bus may be one or more of an address bus, a data bus, or a control bus. For ease of representation, the bus in the figure is represented by using only one bold line, which does not mean that there is only one bus or one type of bus.

The storage may include a high-speed random access memory (RAM). Optionally, the storage may further include a non-volatile memory. For example, the storage may include a magnetic disk storage.

The processor may be a central processing unit (CPU), or the processor may be an application specific integrated circuit (ASIC), or the processor may be configured to be one or more integrated circuits to implement the embodiments of the present disclosure.

The graphical interface update method and apparatus provided in one or more embodiments of this application are described above. The graphical interface update method may be applied in a server-client architecture. When a server in the server-client architecture is a cloud server, the server is also referred to as a Trace end, and the Trace end performs a main logic operation of an application program; and a client, also referred to as a Retrace end, is configured to: present a graphical interface of the application program, and receive user input.

A person skilled in the art may understand that the graphical interface may be divided into multiple graphics, and the server store vertex data of these graphics. The graphical interface may be drawn according to the vertex data. The server may store the vertex data in a buffer area (the buffer area storing the vertex data is referred to as a vertex buffer area for short), to increase an access speed. Certainly, the vertex data is only an example of data that can be used for drawing the graphical interface, and the present disclosure is not limited thereto.

With running of the application program, the server discovers that one or more intervals of the vertex buffer area (or the vertex data) needs to be updated, the server may mark the interval as a dirty interval first (a region of the graphical interface that corresponds to the dirty interval is the dirty region), and then updates the dirty interval. After updating the dirty interval, if the server does not receive an instruction for drawing the graphical interface (that is, the displayed graphical interface does not needs to be redrawn or updated temporarily), the server does not send the updated data interval to the user equipment (that is, the client).

With continued running of the application program, one or more regions of the graphical interface may need to be redrawn (or updated). The region is also referred to as the drawing area. An interval of the vertex buffer area (or the vertex data) that corresponds to the drawing area is referred to as a drawing interval. In the vertex data, only data both in the drawing interval and the dirty interval (that is, an intersection set between the dirty interval and the drawing interval) is required for redrawing the graphical interface. To save network traffic, the server sends only the data of the intersection set to the user equipment, to redraw the graphical interface (that is, update the graphical interface). Certainly, the graphical interface may alternatively be redrawn on the server, and then the server sends a drawn graphical interface to the user equipment for display.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also know that the embodiments described in this specification all belong to preferred embodiments, and the involved actions and modules are not mandatory in the present disclosure.

A person of ordinary skill in the art may understand that all or some of the steps of the methods in the embodiments may be implemented by using a program instructing relevant hardware. The program may be stored in a computer-readable storage medium. The storage medium may include: a ROM, a RAM, a magnetic disk, an optical disc, or the like.

A graphical interface update method and apparatus provided in the embodiments of the present disclosure are described above in detail. In this specification, specific examples are used to describe the principle and implementation manners of the present disclosure, and the descriptions of the foregoing embodiments are only used to help understand the method and core idea of the present disclosure. In addition, a person of ordinary skill in the art may make modifications to the specific implementation manners and the application scope according to the idea of the present disclosure. In conclusion, the content of this specification shall not be understood as a limitation to the present disclosure.

What is claimed is:

1. A method of updating a graphical interface, comprising:
    obtaining a lock instruction;
    determining an instruction data stream corresponding to not sending the lock instruction to a user equipment;
    determining a dirty region according to a data interval indicated by the lock instruction, the dirty region being a region that needs to be changed in a graphical interface;
    based on the dirty region being determined, obtaining buffered data required for the graphical interface, and an unlock instruction;
    determining the instruction data stream corresponding to not sending the buffered data and the unlock instruction to the user equipment;
    obtaining a drawing instruction, the drawing instruction indicating a drawing area;
    calculating an intersection set between the drawing area and the dirty region; and
    sending, to the user equipment, an instruction data stream indicating the intersection set to allow the user equipment to update the graphical interface according to the instruction data stream.

2. The method according to claim 1, further comprising:
    sending an instruction data stream of the drawing instruction to the user equipment.

3. The method according to claim 1, wherein before the sending, to the user equipment, an instruction data stream indicating the intersection set, the method further comprises:
    determining whether the intersection set is null, and if the intersection set is not null, generating a simulated lock instruction, a memory copy instruction, and a simulated unlock instruction for the intersection set.

4. The method according to claim 1, wherein the method further comprises:
    removing the intersection set from the dirty region to update the dirty region.

5. The method according to claim 1, wherein the method is applied to a server, and the server is connected to the user equipment, and
    the updating of the graphical interface according to the instruction data stream comprises:

executing the drawing instruction, and updating the dirty region by using the intersection set.

6. The method according to claim 1, wherein the graphical interface comprises multiple graphics, and the method further comprises:
generating a vertex buffer area, the vertex buffer area comprising vertex data of each graphic of the graphical interface.

7. The method according to claim 6, wherein the determining of the dirty region comprises:
determining that one or more data intervals in the vertex buffer area is a dirty interval, an area of the graphical interface that corresponds to the dirty interval being the dirty region; and
updating the dirty interval.

8. A graphical interface update device, comprising:
a processor; and
a memory,
wherein the memory stores a program instruction, and when the instruction is executed by the processor, the graphical interface update device is configured to perform the method according to claim 1.

9. An apparatus for updating a graphical interface, comprising:
a memory storing instructions; and
a processor configured to execute the instructions to:
obtain a lock instruction;
determine an instruction data stream corresponding to not sending the lock instruction to a user equipment;
determine a dirty region according to a data interval indicated by the lock instruction, the dirty region being a region that needs to be changed in a graphical interface;
based on the dirty region being determined, obtain buffered data required for the graphical interface, and an unlock instruction;
determine the instruction data stream corresponding to not sending the buffered data and the unlock instruction to the user equipment;
obtain a drawing instruction, the drawing instruction indicating a drawing area;
calculate an intersection set between the drawing area and the dirty region; and
send, to the user equipment, an instruction data stream indicating the intersection set, to allow the user equipment to update the graphical interface according to the instruction data stream.

10. The apparatus according to claim 9, wherein the processor is further configured to execute the instructions to:
send an instruction data stream of the drawing instruction to the user equipment.

11. The apparatus according to claim 9, wherein the processor is further configured to execute the instructions to:
determine whether the intersection set is null; and
generate, if the intersection set is not null, a simulated lock instruction, a memory copy instruction, and a simulated unlock instruction for the intersection set.

12. The apparatus according to claim 9, wherein the processor is further configured to execute the instructions to,
remove the intersection set from the dirty region to update the dirty region.

13. The apparatus according to claim 9, wherein the processor is further configured to execute the instructions to:
update the dirty region by using the intersection set.

14. A non-transitory computer readable medium configured to store instructions for updating a graphical interface, the instructions causing a computer to:
obtain a lock instruction;
determine an instruction data stream corresponding to not sending the lock instruction to a user equipment;
determine a dirty region according to a data interval indicated by the lock instruction, the dirty region being a region that needs to be changed in a graphical interface;
based on the dirty region being determined, obtain buffered data required for the graphical interface, and an unlock instruction;
determine the instruction data stream corresponding to not sending the buffered data and the unlock instruction to the user equipment;
obtain a drawing instruction, the drawing instruction indicating a drawing area;
calculate an intersection set between the drawing area and the dirty region; and
send, to the user equipment, an instruction data stream indicating the intersection set to allow the user equipment to update the graphical interface according to the instruction data stream.

* * * * *